Dec. 16, 1969 L. N. O'CONNOR 3,484,824
CHAD DISPOSAL DEVICE
Filed May 31, 1968

INVENTOR.
LEONARD N. O'CONNOR
BY Samuel R. Genca
ATTORNEY

United States Patent Office 3,484,824

Patented Dec. 16, 1969

3,484,824

CHAD DISPOSAL DEVICE

Leonard N. O'Connor, Rochester, N.Y., assignor to Friden, Inc., a corporation of Delaware Filed May 31, 1968, Ser. No. 733,535
Int. Cl. G06k *1/02;* B26d *7/18*
U.S. Cl. 234—131 10 Claims

ABSTRACT OF THE DISCLOSURE

A chad disposal device for a tape-punching machine wherein the vibrations of the operating machine are utilized by a resonant electrically conducting member disposed in a chad hood. The resonant member vibrates and resonates with one of the frequencies of vibration to agitate and drive chad away from the hood and into a chad chute thereby eliminating the problem of compacting of the chad within the hood. The resonant conducting member also conducts static electricity from the chad to ground through the machine to eliminate a problem of chad clogging which may be caused by a static electrical charge on the punched chad.

Figure 1:
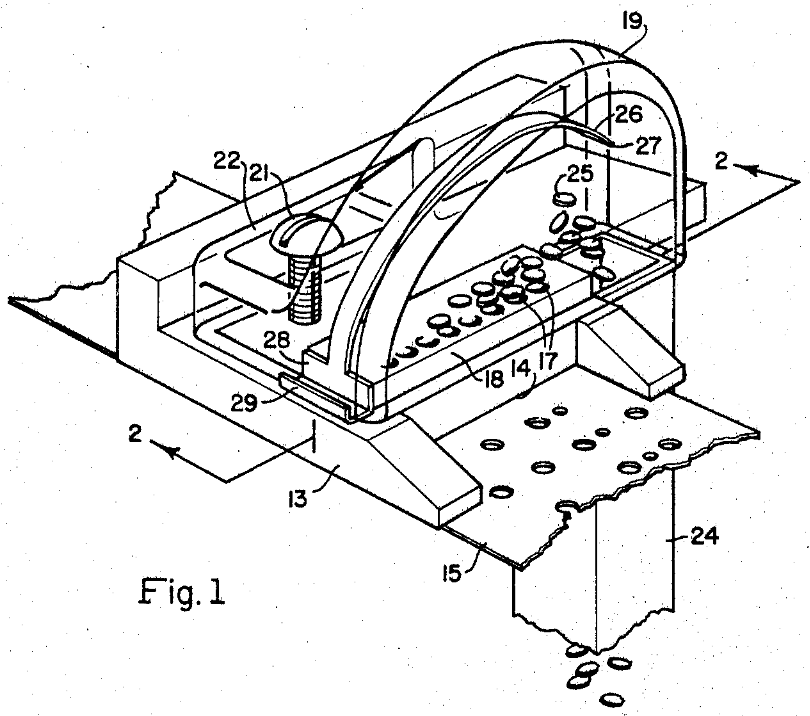

The present invention relates to data punched tape recording apparatus and, more particularly, relates to an improved chad disposal device therefor.

For convenience, reference herein to tape as a data information recording medium will be understood to be a generic reference applicable to tape conventionally fabricated of paper stock or like thin material, to tabulating cards, and to like forms of perforatable webs. Similarly, reference to tape-punching machines will be understood to be a generic reference to machines for recording data information on such perforatable webs in the form of permutational code perforations therein.

The tape-punching machine or punch receives an unperforated length of tape and records data information threin by punching permutational code holes aligned in rows corresponding to individual code elements or bits of the code system employed and in columns of information-item code-bit groups recorded in succession along the tape which is advanced in column by column step. The tape is usually supplied to the punch from a roll of substantial length, but a succession of physically connected and fan-folded tabulating cards may be supplied for edge punching by the punch to provide a conveniently handled record of limited information content as in the Blodgett et al. U.S. Patent No. 3,366,322. After the recording of data by the tape punch has been effected, the tape may be stored for later use or may be used immediately by a tape reader for print-out of the recorded data or its recording in another record medium or other like use.

In the past, chad or material which is punched from the tape is normally directed away from the punches by means of a hood disposed over the punches. When the chad is punched from the tape, it is pushed into the hood over the punches and then directed to a chad chute where it flows away from the hood by the force of gravity.

Disposal of chad is a problem of long standing in the art, particularly in high speed punches or tape-punching machines. One of the major problems is that the chad may compact and clog the hood and chute, thus necessitating a shut-down of the punch until the hood and chute are cleared. A contributing factor to the clogging may be due to a static electrical charge on chad caused during high speed reeling of the tape roll.

In the past, attempts have been made to solve the chad disposal problem by lubricating the hood and chute or treating the tape with a lubricant or coating which eliminates static electricity on the tape. The prior art attempts have disadvantages in that the lubricant in the hood and chute may wear at a relatively high rate and require frequent re-coating of the hood and chute. Further, treated tapes are generally more expensive than untreated papers. Therefore, it is less expensive to use untreated tapes.

Accordingly, it is an object of the present invention to provide a novel chad disposal device for a tape-punching machine.

It is another object of the present invention to provide a novel chad disposal device which grounds static electrical charge on chad in a hood.

It is still another object of the present invention to provide an improved chad disposal device for a high speed tape punch wherein electrically charged chad is grounded and activated by vibration for a smooth non-clogging outflow of chad from the tape-punching machine.

It is yet another object of the present invention to provide an inexpensive, easy to manufacture, highly efficient chad disposal device.

It is a further object of the present invention to overcome the aforesaid problems of the prior art.

Briefly described, the present invention accomplishes the above and other objects in a chad disposal device for a punched tape recording apparatus which naturally vibrates with at least one frequency of vibration and which includes at least one code punch and die set. The chad disposal device comprises a collection means including a hood having an exit for collecting and directing chad from the punch and die set to the exit. A resonant means including a resonant member is disposed in the hood and is responsive to the one frequency of vibration for vibrating at that one frequency to fluidize the chad for a smooth flow of the chad through the exit and a chad chute connected thereat. The resonant member is made of an electrically conducting material such as steel, Phosphor bronze, and the like so that it may ground a static electrical charge on the chad thereby grounding and vibrating the chad to eliminate the problem of chad compacting within the hood and chute.

Figure 2:
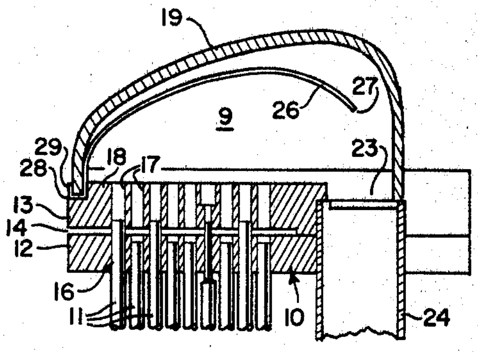

Other and further advantages of the invention will appear as the detailed description thereof proceeds in the light of the drawing forming a part of this application and in which:

FIG. 1 illustrates a perspective view of a chad disposal device coupled to a tape-punching machine in accordance with the invention; and FIG. 2 is a sectional view of the chad disposal device shown in FIG. 1 viewed alon gthe plane 2—2 therein.

The present invention may be embodied in different punched tape recording apparatus or tape-punching machine and is shown by way of example in FIGS. 1 and 2 in one embodiment of the structure shown in U.S. Letters Patent No. 3,366,322 entitled "High Speed Punch" issued Jan. 30, 1968, to E. O. Blodgett, and assigned to the same assignee as the present application. Only the structure necessary to show the invention is illustrated in FIGS. 1 and 2. For a more complete description of the high speed punch, reference may be made to the above-mentioned patent.

Referring to the drawing, a chad disposal device 9 is shown coupled to an exemplary tape-punching machine or punch. The punch includes a group of punch pins 11, nine including the feed hole punch. The punch pins 11 are reciprocally mounted in alignment in a guide portion 12 of a die 13 forming the punch and die set 10. The guide portion 12 is coplanar with the die 13 and is spaced therefrom by a horizontal slit 14 which is sufficiently wide and deep to accommodate a tape 15 for free sliding motion therethrough as illustrated in FIG. 1. The bottom portion of the slit 14 is coplanar with a table (not shown) of the punch. The guide portion 12 is used as a punch pin guide and includes nine lower pin guide apertures such as apertures 16 and nine upper guide apertures such as apertures 17 coaxially aligned with the associated apertures 16. The nine punch pins 11 are engaged with these guide pin apertures for reciprocal upward and downward motion therein. The nine punch pins 11 are arranged in a straight line transverse of the direction of feed of the tape 15. It should be understood that a different number of pins 11 may be used without departing from the invention. The die 13 includes a rectangular raised portion 18 centered on the column of apertures 16 which acts to receive a hood 19.

The hood 19 is secured to the die block set 10 by a screw 21 extending through a lateral extension 22 of the hood 19. The hood 19 and rectangular raised portion 18 form an exit at 23. Connected to the exit 23 is a chute 24 which communicates with the hood 19 and which leads to a chad hopper (not shown) below the punch. Punched out chad 25 of the tape 15 is collected and directed by the hood 19 to the chute 24. The chad flows by the force of gravity through the chute 24 to the chad hopper for collection and discard.

In accordance with the invention, the chad disposal device 9 includes a resonant member 26 which is made of an electrically conducting material such as steel, Phosphor bronze, or the like. The resonant member 26 is free to vibrate at one end 27 and fixed at the opposite end 28 thereof between the die 13 and the hood 19. The resonant member 26 is electrically grounded to the die 13 and provides a low impedance or short circuit to ground for static electricity which may be charged on the chad 25 within the hood 19. When static electricity is not a problem, the member 26 may be made of a non-conducting material such as a plastic material. The opposite end 28 of the resonant member 26 includes a tab portion 29 which clamps to the hood 19. The resonant member 26 is disposed over the apertures 17 and is spaced therefrom to permit the chad to collect therebetween. The resonant member 26 is spaced from the hood 19 so that it may vibrate at the free end 27 in a fluxural mode. Normally, a punch utilizing the chad disposal device vibrates with at least one frequency of vibration. In some cases, the punch may vibrate with a complex wave form indicating the one frequency of virbation.

In accordance with the invention, the resonant member 26 has a cross-sectional area, length, and mass, such that it vibrates in resonance at one of the frequencies of vibration of the punch. It should be understood, of course, that where a punch does not naturally vibrate sufficiently to excite the resonant member 26 into vibrations, a means such as a piezo-electric element (not shown) may be coupled to the resonant member to excite it into vibrations.

The free end 27 of the resonant member 26 is disposed above the exit 23 so that the free end 27 may beat against the chad disposed over the exit 23 and at the same time vibrate chad 25 towards the exit 23.

In the operation of the chad disposal device, the punch pins 11 punch out chad directly below the resonant member 26. During the punch-out operation of the punch, the punch naturally vibrates with at least one of the aforesaid frequencies to excite the resonant member 26 into vibrations. The resonant member 26 vibrates the chad 25 and effectively fluidizes the chad 25 so that it may easily flow from the hood 19 through the exit 23 and chute 24. The free end 27 of the resonant member 26 at or near resonance beats on the chad 25 directly over the exit 23 forcing the chad 25 through the chute 24.

The resonant member 26 also serves another function other than that just described in the operation. The resonant member 26 electrically grounds static electricity which may be charged on the chad 25. The member 26 grounded to the die 13 provides a low impedance electric path to ground. The grounding of the chad is particularly desirable when the tape 15 is reeled at a relatively high speed and charged with static electricity.

It will be evident from the foregoing description of the invention that a chad disposal device embodying the invention is a compact, relatively simple construction for the disposal of chad from a tape-punching machine.

While there has been described for purposes of illustration a specific form of the invention, it is contemplated that numerous changes may be made without departing from the spirit of the invention.

What is claimed is:

1. In a punched tape recording apparatus which naturally vibrates with at least one frequency of vibration and which includes at least one code punch and die set, a chad disposal device comprising:

(a) collection means including an exit for collecting and directing chad from said punch and die set to said exit;

(b) resonant means disposed in said collection means and responsive to said one frequency of vibration for vibrating said chad at said one frequency at said exit to urge said chad therethrough; and (c) a chad chute connected to said exit for guiding said chad therethrough.

2. The invention defined in claim 1 wherein said resonant means includes a resonant longitudinal member fixed at one end and free at the opposite end to vibrate in resonant at said one frequency.

3. The invention defined in claim 1 wherein said resonant means includes means for grounding static electricity on said chad.

4. The invention defined in claim 1 wherein said resonant means includes a resonant electrically conducting resilient member.

5. The invention defined in claim 1 wherein said resonant means includes an electrically conducting resonant member disposed over said punch and die set and having a free end thereof disposed proximal to said exit.

6. The invention defined in claim 1 wherein said resonant means includes a resonant longitudinal member disposed over said die set and having a free end disposed over said exit.

7. In a chad producing tape-punching machine including at least one punch and die set, a chad disposal device comprising:

(a) collection means including a hood having an exit for collecting and directing chad from said punch and die set;

(b) resonant means including a resonant member disposed in said collection means for vibrating said chad at said exit to urge said chad therethrough; and (c) means for vibrating said resonant member.

8. The invention defined in claim 7 wherein said last-named means is disposed in said tape-punching machine.

9. The invention defined in claim 7 wherein said resonant member is electrically conducting and connected to said machine.

10. The invention defined in claim 7 wherein said resonant member includes a free end which is disposed over said exit and vibrates in a fluxural mode.

References Cited

UNITED STATES PATENTS

| | | | |
|---|---|---|---|
| 1,236,891 | 8/1917 | Walden | 83—149 |
| 1,852,202 | 4/1932 | Crumrine | 83—149 |
| 3,199,389 | 8/1965 | Cone | 83—149 X |
| 3,301,477 | 1/1967 | Edwards | 234—131 X |

WILLIAM S. LAWSON, Primary Examiner

U.S. Cl. X.R.

83—149